Dec. 22, 1959 K. A. KOLLMANN ET AL 2,917,899
HYDRODYNAMIC COUPLING, ESPECIALLY FOR MOTOR VEHICLES
Filed Nov. 30, 1953 2 Sheets-Sheet 1
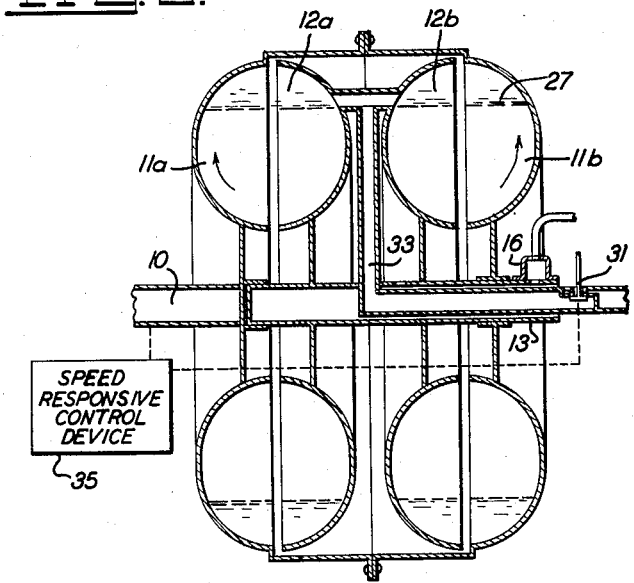
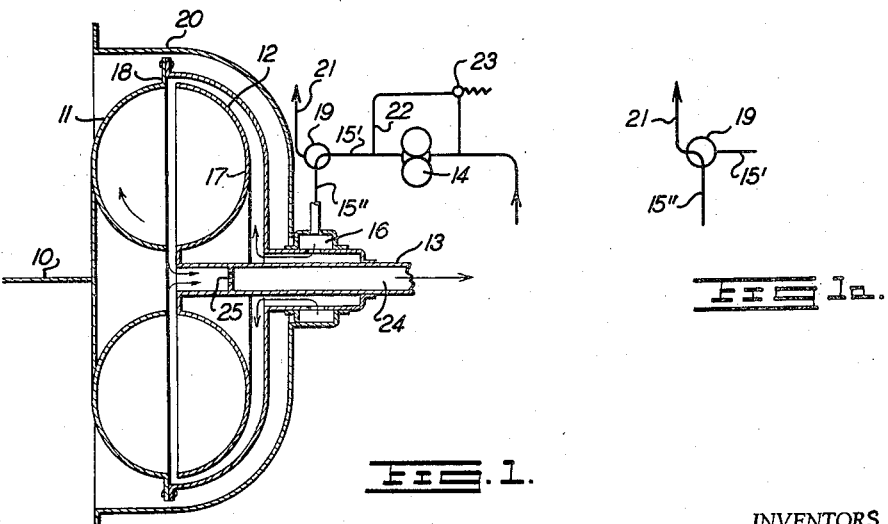
INVENTORS.
KARL A. KOLLMANN
ULRICH ELTZE
BY Dicke and Craig
ATTORNEYS Dec. 22, 1959 K. A. KOLLMANN ET AL 2,917,899
HYDRODYNAMIC COUPLING, ESPECIALLY FOR MOTOR VEHICLES
Filed Nov. 30, 1953 2 Sheets-Sheet 2
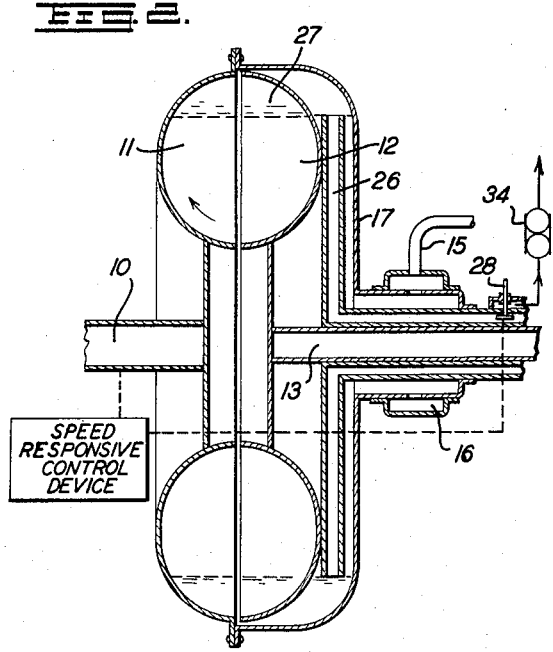
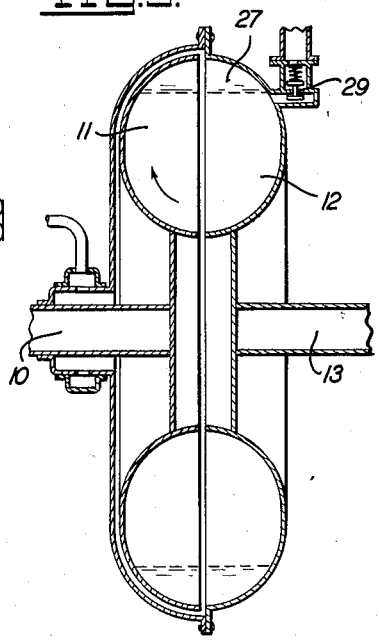
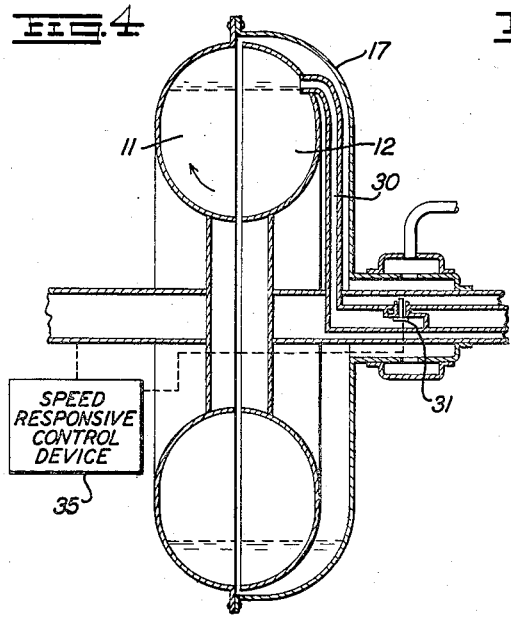
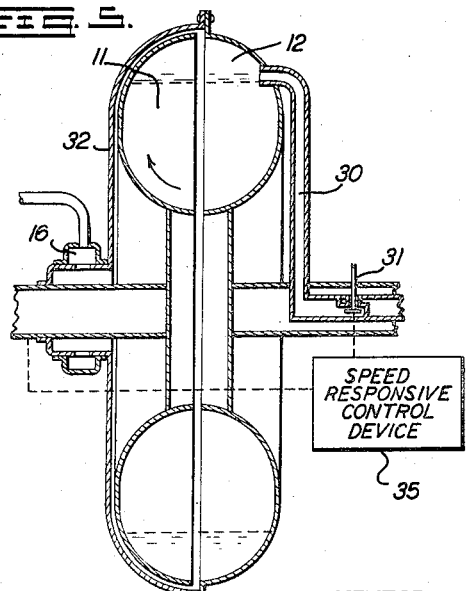
INVENTOR.
KARL A. KOLLMANN
ULRICH ELTZE
BY
Dicke and Craig
ATTORNEYS United States Patent Office 2,917,899
Patented Dec. 22, 1959

2,917,899

HYDRODYNAMIC COUPLING, ESPECIALLY FOR MOTOR VEHICLES

Karl A. Kollmann, Karlsruhe, and Ulrich Eltze, Stuttgart-Unterturkheim, Germany, assignors to Daimler-Benz Aktiengesellschaft, Stuttgart-Unterturkheim, Germany Application November 30, 1953, Serial No. 395,224

2 Claims. (Cl. 60—54)

The present invention relates to a hydrodynamic coupling, especially for motor vehicles, and to means for controlling the fluid level therein.

It is the primary object of the present invention to devise a mechanism for regulating the fluid content of such a coupling so as to avoid the so-called creeping of the vehicle when the engine is idling. The present invention accordingly consists in partly or entirely draining the fluid coupling when the vehicle or the coupling is standing still or moving very slowly, and in automatically discontinuing the discharge of fluid from the coupling at higher speeds. According to the present invention, the coupling may be drained of fluid by shutting off the supply conduit from the fluid pump in accordance with the driving or coasting speed or the speed of rotation of the vehicle engine, and by placing such conduit under atmospheric pressure. The degree of draining the coupling may at the same time be controlled by means of a throttle or diaphragm provided in the discharge conduit of the coupling, and by so dimensioning and arranging such discharge conduit that, when the engine or the primary or driving part of the coupling is idling, the coupling will only be partly drained.

The coupling may also be drained in a manner known as such by means of a stationary discharge conduit or member or a valve mechanism which is separately controlled by the speed and not affected by the centrifugal force, or by a rotating valve which is controlled by the centrifugal force and preferably arranged in the secondary or driven part of the coupling.

It is another object of the present invention to reduce the amount of fluid rotating in the coupling during idling and thereby to reduce the residual moment of the coupling to such an extent that a movement or creeping of the vehicle on a level road will no longer occur.

The present invention is applicable not only to the normal type of fluid coupling but also to the multiple type, for example, a double coupling.

Further objects, features, and advantages of the present invention will appear from the following description thereof and the accompanying diagrammatic drawings, in which—

Fig. 1 diagrammatically illustrates a fluid coupling according to the present invention with a pump for supplying fluid to the same, and a control mechanism for regulating the amount of fluid in the coupling;

Fig. 1a is a detail view of the control valve shown in Fig. 1 in a different position of operation;

Fig. 2 shows a modified control mechanism for regulating the amount of fluid in the coupling;

Fig. 3 shows the automatic control mechanism according to the present invention arranged in the secondary or driven part of the fluid coupling;

Fig. 4 is an embodiment of the present invention generally similar to that shown in Fig. 2 and only differing in several details thereof;

Fig. 5 is a modification of the present invention, generally similar to the embodiment shown in Fig 4; and Fig. 6 illustrates a control mechanism similar to that shown in Figs. 4 and 5, but applied to a double coupling.

In Fig. 1, a fluid, for example oil, is supplied to the fluid coupling in a conventional manner either directly by a pump 14 from a suitable container or sump or, indirectly, from the coupling housing through a conduit 15', 15" and the inlet chamber 16 of the coupling. From this chamber the fluid then may enter the inside of the cover 17 of the coupling through appropriate openings provided therein, which cover 17 is secured to and rotates together wth the primary or driving part 11 forming an impeller of the coupling, and fill up the coupling through the outer slot 18 between the two cuplike members forming the coupling. The supply conduit 15' contains a throttle or control valve 19 which, in the position shown in Fig. 1, connects the section 15' with the section 15", but separates them when in the position shown in Fig. 1a in which it connects the section 15" with a conduit 21 leading back to the suction side of the pump 14 or to the inside of the coupling housing 20. The valve may be controlled in a manner generally known and not shown in the drawing, either in accordance with the driving speed, or the speed of rotation of the secondary or driven part 12 forming the turbine of the coupling, or the speed of the engine. This may be done by an appropriate mechanism which turns the valve 19 from the position shown in Fig. 1 to that shown in Fig. 1a when the accelerator of the engine is in idling position and the speed of rotation of the driven part of the coupling is zero or near zero. A short-circuit conduit or by-pass 22 with a check valve 23 therein may return the fluid from the pressure side to the suction side of the pump 14 when the control valve 19 is shut off.

The drainage of the coupling during the idling speed of the primary half of the coupling proceeds or takes place through the return conduit 24 within the shaft 13 which also contains a throttle or diaphragm 25. Since the centrifugal forces acting on the fluid in the coupling are greatly reduced during idling speed only a portion of the fluid will be forced outwardly while another portion of the fluid remains distributed between the primary and the secondary halves of the coupling near the inner parts thereof which may be drained off through discharge conduit 24. If the control valve 19 is moved to the position shown in Fig. 1a, the coupling is drained of fluid when the engine is idling, but only partially to such extent that a certain fluid level remains therein, thereby retaining a residual moment. The extent of partial drainage of the fluid from the coupling of this embodiment is determined by the size of the opening of the throttle or diaphragm 25.

If the accelerator is again depressed to increase the speed of the engine or vehicle, the control valve 19 is again turned to the position shown in Fig. 1, so that the pump 14 can quickly fill up the coupling with fluid thereby enabling it to transmit the entire driving force of the engine.

In the embodiment of the invention shown in Fig. 2, one or more stationary discharge conduits 26 are secured within the coupling housing 17 and extend radially therein up to the desired fluid level 27 in the coupling housing. When the driving speed of the vehicle or the speed of rotation of the drive shaft 13 decreases below a certain minimum value, a valve 28 opens in accordance with the vehicle speed, that is, under the control of a centrifugal governor or suitable hydraulic means operatively connected between the driving member 10 and the valve 28. When the valve 28 thus opens, the coupling is drained down to the fluid level 27 determined by the centrifugal forces existing within the coupling, for example, by a suitable return pump 34.

In the embodiment of the invention shown in Fig. 3, a valve 29 is provided within the secondary or driven part 12 of the coupling and at the height of the fluid level 27 therein. This valve closes under the action of the centrifugal force against the pressure of a spring when the speed of rotation of the driven coupling part 12 increases above a certain idling speed, or it opens as soon as the speed of rotation decrease below such speed.

In the embodiment of the invention shown in Fig. 4, a discharge member 30, which rotates with the driven part 12 of the coupling, is connected with a valve 31 which is controlled either in accordance with the driving speed in the manner as shown in Fig. 2, that is, by a separate governor, or directly by centrifugal force caused by rotation of the driven part 12 through a suitable arrangement of the valve. The secondary or driven part 12 is, as in the embodiments shown in Figs. 1 and 2, closed toward the outside by a cover 17 which rotates together with the driving part 11 and through which the fluid is supplied to the inside of the coupling.

The embodiment of the invention shown in Fig. 5 differs from that shown in Fig. 4 merely in that, similar to Fig. 3, the cover 32 of the fluid coupling is connected to the driven part thereof. The fluid is, in this case, similarly supplied through the cover at the inlet chamber 16.

Fig. 6 illustrates how the invention may be applied to a double coupling in which the driving parts 11a and 11b of the two couplings are mounted with respect to the driven parts 12a and 12b, respectively. The discharge member 33 extends radially outward and between the two driven parts 12a and 12b and up to the fluid level 27. The valve 31, which is located in the discharge conduit within the rotating shaft 13 may be controlled by the centrifugal force or by a special speed governor. The fluid, in this case, is supplied similarly through the cover at the inlet chamber 16.

In each of the embodiments of Figures 4, 5 and 6, a conventional speed-responsive device 35, shown schematically therein which may be of conventional construction, for example, a speed governor, is operatively connected with the driving shaft 10 and with the discharge valve 31 so as to control the latter in dependence on the speed of the former.

The operation and effect of the various embodiments shown in Figures 2 to 6 is basically the same as in the embodiment shown in Figure 1. In Figures 4, 5 and 6 the fluid is forced out of the exit tubes 30 and 33 respectively because these tubes are carried by the turbine rotor which rotates slower than the impeller rotor and the mouth of these tubes is exposed to the high pressure area of fluid shortly after it leaves the impeller outlet. In Figure 2, the discharge conduit or conduits 26 which effect drainage are disposed radially within the coupling housing 17 and are stationary. The coupling housing 17 in turn is connected with the driving part 11 of the coupling. The arrangement and location of the control valve, which automatically shuts off the draining mechanism when the rotation exceeds a certain speed, does not exclude the possibility of additionally controlling this valve either manually or in accordance with other operating factors, or of additionally providing a suitably controlled regulating device, for example, for controlling the torque which the novel coupling is designed to transmit. Also, the conduit for supplying the fluid to the coupling may extend in any desired or suitable manner, for example, through the hollow shaft 13 and through the central part between the driven parts 12a and 12b of the coupling.

Various other modifications may be made without departing from the scope of the invention as defined in the following claims.

We claim:
1. A fluid coupling for motor vehicles comprising a driving part forming an impeller member and a driven part forming a turbine member for rotation about a common axis, said impeller and turbine members being so related as to form the walls of an essentially closed rotating work chamber wherein fluid circulates through the members by centrifugal force on the fluid in the impeller member and the degree of slip between the members depends on the amount of fluid in the closed work chamber, means for supplying fluid to said coupling, means in said driven part and operatively connected with said work chamber for only partially draining said coupling of fluid, said coupling including hollow shaft means, said draining means including a discharge valve mounted within said hollow shaft means disposed within said driven part and discharge conduit means communicating with said hollow shaft means and said work chamber, said discharge conduit means extending essentially radially outwardly from said hollow shaft means and connecting with said work chamber at a point spaced a substantial distance form the radially outermost part of said work chamber, means for controlling the operation of said valve in accordance with the speed of said driving part for only partially draining said coupling of fluid during slow idling speed of said driving part only and for automatically discontinuing said draining upon increase in the speed of said driving part.

2. A fluid coupling for motor vehicles comprising a driving part forming two impeller members and a driven part forming two turbine members for common rotation about an axis, said impeller and turbine members being so related as to form the walls of two essentially closed rotating work chambers wherein fluid circulates through the members by centrifugal force on the fluid in the impeller members and the degree of slip between the members depends on the amount of fluid in the enclosed work chambers, means for supplying fluid to said coupling, means for partially draining said coupling of fluid, said coupling including hollow shaft means disposed within said driven parts, said draining means including a discharge valve mounted within said hollow shaft means and discharge conduit means communicating with said hollow shaft means and extending essentially radially outwardly from said hollow shaft between said turbine members, fluid passage means connecting said turbine members with each other at a point spaced a substantial distance radially inward from the radially outermost part of said work chambers, the outer end of said discharge conduit means being connected to said fluid passage means, means for controlling the operation of said valve in accordance with the speed of said driving part for only partially draining said work chambers when said driving part is only slowly idling so as to reduce rotation of said driven part, and for automatically discontinuing such draining when the speed of said driving part increases.

References Cited in the file of this patent

UNITED STATES PATENTS

| | | |
|---|---|---|
| 1,389,562 | Schneider | Aug. 30, 1921 |
| 2,014,944 | Martyrer et al. | Sept. 17, 1935 |
| 2,256,878 | Black | Sept. 23, 1941 |
| 2,287,374 | Dodge | June 23, 1942 |
| 2,508,442 | Becker | May 23, 1950 |
| 2,534,517 | Jenny | Dec. 19, 1950 |
| 2,569,087 | Alexandrescu | Sept. 25, 1951 |
| 2,625,014 | Wolf | Jan. 13, 1953 |
| 2,651,919 | Venstrom | Sept. 15, 1953 |
| 2,673,450 | Wolf | Mar. 30, 1954 |
| 2,689,458 | Weymann | Sept. 21, 1954 |
| 2,693,677 | Stalker | Nov. 9, 1954 |